United States Patent [19]

Helmle et al.

[11] Patent Number: 4,566,528

[45] Date of Patent: Jan. 28, 1986

[54] REGULATOR CIRCUIT FOR VEHICLE AIR CONDITIONER

[75] Inventors: Theodor Helmle, Ellwangen; Kurt Weber, Stuttgart, both of Fed. Rep. of Germany

[73] Assignee: Süddeutsche Kühlerfabrik Julius Fr. Behr GmbH & Co KG, Stuttgart, Fed. Rep. of Germany

[21] Appl. No.: 606,577

[22] Filed: May 3, 1984

[30] Foreign Application Priority Data

May 3, 1983 [DE] Fed. Rep. of Germany ....... 3316060

[51] Int. Cl.⁴ .............................................. F25B 29/00
[52] U.S. Cl. ........................................ 165/26; 165/43;
236/91 D; 236/91 G
[58] Field of Search .............................. 165/26, 42, 43;
236/91 D, 91 F, 91 G; 62/227

[56] References Cited

U.S. PATENT DOCUMENTS

| | | | |
|---|---|---|---|
| 4,143,706 | 3/1979 | Schnaibel et al. | 165/26 |
| 4,416,324 | 11/1983 | Sutoh et al. | 165/43 X |
| 4,417,618 | 11/1983 | Yoshimi et al. | 236/91 G X |
| 4,450,897 | 5/1984 | Iijima et al. | 236/91 D X |
| 4,482,092 | 11/1984 | Biber et al. | 165/43 X |

FOREIGN PATENT DOCUMENTS 2520465 11/1976 Fed. Rep. of Germany .... 236/91 F
2436345 5/1980 France ................................ 165/26

Primary Examiner—William R. Cline
Assistant Examiner—Randolph A. Smith
Attorney, Agent, or Firm—Barnes & Thornburg

[57] ABSTRACT

A regulator circuit for controlling the cooling and heating power for automotive vehicles, wherein signals proportional to the external temperature, the internal temperature of the vehicle, and the desired temperature are applied to an input amplifier, the output signal of this amplifier being applied as the desired value to the heating system. This output signal is also fed to a second amplifier which is furthermore supplied with the signal proportional to the external temperature. The output signal of this second amplifier serves as the desired value for the cooling system. By means of this arrangement, excessive cooling at the transition point between heating and cooling, as well as oscillation around this transition point, can be prevented. An economical reheat operation is made possible for dehumidifying the air by appropriate selection of resistor values such that the heating system and the cooling system are in simultaneous operation.

14 Claims, 7 Drawing Figures

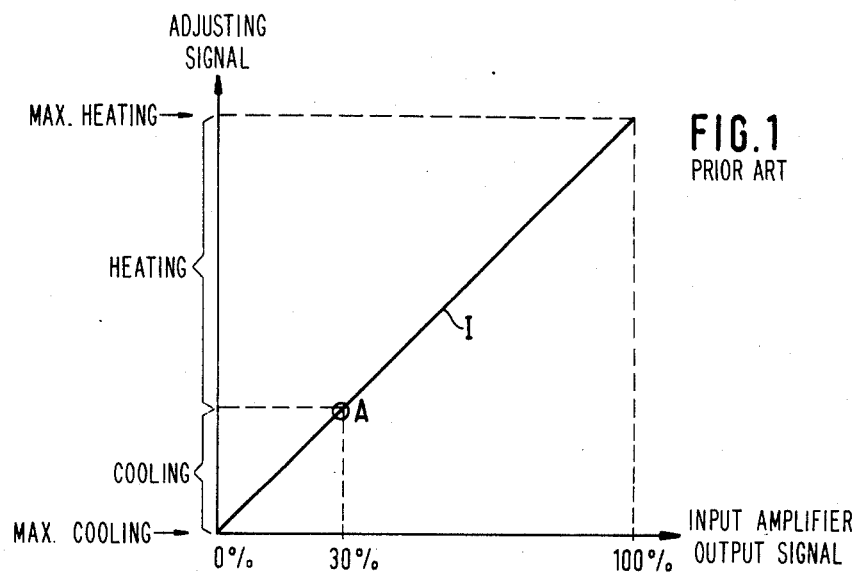
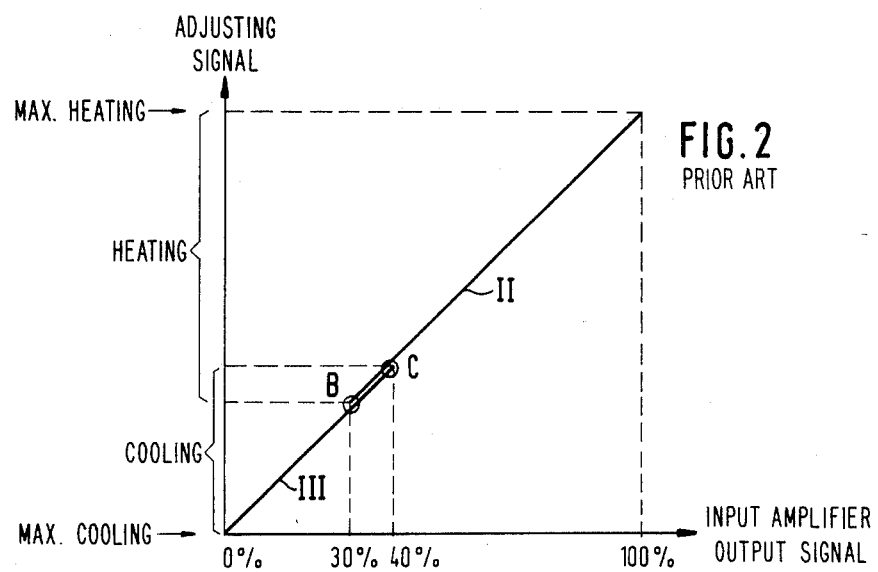

REGULATOR CIRCUIT FOR VEHICLE AIR CONDITIONER

BACKGROUND OF THE INVENTION

The invention relates to a regulator circuit for controlling the cooling and heating of automotive vehicles, and consists generally of an input amplifier supplied with signals proportional to the external temperature, and the internal temperature of the vehicle, and the desired temperature, the output signal of this amplifier regulating the heating system, and, by way of a second amplifier, the cooling system.

A regulator circuit of this general type is disclosed in published German Application No. 29 52 210 in which a differential amplifier is provided which receives the weighted control signals of an internal temperature sensor and a desired value setpoint control. The circuit regulates the heat exchanger of the heater by way of a change-over switch and a servo member. At the same time, the output signal of this differential amplifier is transmitted via an isolated amplifier and regulates the clutch of the compressor pertaining to the cooling system by way of a series of additional functional elements, including a limiter, a weighting circuit, a threshold switch, and a switching stage. Such a regulating circuit can also control additional functional elements of an air conditioning unit, such as a fresh air/circulated air flap.

With any such air conditioning system, switch-over must be provided from heating operation to cooling operation. The output signal of the input amplifier can be utilized for switch-over. Once this output signal falls below a certain value, switch-over is performed from heating operation to cooling operation in the conventional manner. This procedure has the drawback that the same desired value is set for the transition point of the cooling system independently of how this desired value was formed from the input variables of the input amplifier. The desired value may be given to the cooling system too high for the instantaneously ambient outside temperature. If the outside temperature is low during switch-over from heating to cooling operation and the cooling system is set to a desired value that is too large, the interior of the vehicle is cooled off excessively. As a reaction, the desired value rises again, effects cutoff of the cooling system, and activates the heating system. Subsequently, the desired value again falls below the transition point so that the cooling system is reactivated. Thus, oscillation results around the transition point between heating and cooling. This behavior is found to be uncomfortable by the occupants of the vehicle and requires increased energy consumption due to the constant activation and deactivation of the heating and cooling systems.

It is an object of the invention to provide a regulator circuit for controlling the cooling and heating power wherein oscillation around the transition point between heating and cooling is prevented. This object has been attained by providing that, in a regulator circuit of the above-discussed type, the second amplifier arranged behind the input amplifier, is additionally supplied with the signal proportional to the outside temperature. This results in the instantaneous external temperature being introduced into the cooling control system as the desired value at the transition point. Thus, when a low outside temperature exists and the system is heating, after the transition point has been passed through, cooling will either not commence or will commence only to a very small extent. Thereby, excessive cooling of the vehicle interior is prevented and oscillation between heating and cooling around the transition point is avoided. Since the cooling power will not become excessively high, a rather stable condition is attained.

It is advantageous to connect the input amplifier and the second amplifier as a summing amplifier. The temperature sensors employed can simply be negative temperature coefficient (NTC) thermistors. It is also possible to apply the signal proportional to the external temperature to an input of the second amplifier by way of a weighting resistor. The effect of the outside temperature on the output signal of the second amplifier can thus be set arbitrarily.

The resistor values pertaining to the summing circuits of the input amplifier and the second amplifier can advantageously be selected so that the cooling power regulation commences when the heating power regulation has reached the value zero. As a result, only a portion of the air conditioning system is always in operation—either the heating system or the cooling system.

However, it is also possible to design the heating range and the cooling range to be overlapping. In this case, a condition can occur wherein the heating system as well as the cooling system are in operation. This measure is called "counter heating" or "reheating" and serves for drying the air passing into the interior of the vehicle. For example, the aforementioned published application describes such a reheater, although this device must be activated manually, or activated by way of an additional switch, for instance, by a moisture probe. In this invention, it is possible to select the resistor values pertaining to the summing circuits of the input amplifier and of the second amplifier so that cooling power regulation starts at an early point in time when the heating power regulation has not as yet reached the value zero. This step leads to an overlapping between the cooling power regulation and the heating power regulation, and thus to an automatic start of reheating. The transition range wherein heating and cooling are carried out simultaneously is automatically set, and remains always of egual size, so that economical operation of the refrigeration compressor is possible. This feature is called "economy reheating." In the conventional regulator circuits, such economical operation has not been feasible, since in all cases a proportional cooling power control occurred which was different with respect to the actuating signal. Furthermore, depending on the outside temperature, different transition ranges prevailed depending on the actuating signal. Accordingly, economical operation of the refrigeration compressor was impossible.

It is expedient to regulate the cooling power conventionally by way of activation and deactivation of a refrigeration compressor with a two-position regulator. In this connection, it is advantageous to transmit the output signal of the second amplifier to the input of this two-position regulator by way of a limiter. This limiter prevents preset desired values lower than 0° C. at the two-position regulator and thus precludes icing of the evaporator laminations. It is furthermore convenient to provide that the two-position regulator activates a relay, and the latter activates an electromagnetic clutch which sets the refrigeration compressor into operation.

In an advantageous further development, the temperature of the evaporator can be detected by an evaporator probe, and the signal transmitted by this evaporaprobe can be fed back to the input of the two-position regulator. The cooling system in this way forms an independent, closed regulating circuit with desired value modulation.

The output signal of the second amplifier can also be used in an advantageous further development for controlling the position of a fresh air/recirculated air flap. This fresh air/recirculated air flap thus is provided with the same desired value as the cooling system, with the difference that limitation of the desired value does not occur. Control can take place suitably by way of a comparator and a recirculated air relay, wherein the fresh air/recirculated air flap is operated to the position "recirculated air" only during maximum cooling power. Thus, the interior of the vehicle is supplied entirely with recirculated air only when the cooling system has already reached the limit of its capacity.

The heating power regulation can be achieved by controlling water flow. In a preferred embodiment, the regulator consists of a comparator to which is fed the output signal of the input amplifier, and a servo member which is a water valve arranged in the water cycle. At a high desired heating value, this water valve is opened and thus permits unhindered passage of water through the heat exchanger. With the heating system deactivated, the water valve is closed so that hot water can no longer enter the heat exchanger. Another advantageous embodiment provides regulation of the heating power on the air side wherein the regulator consists of a position controller to which is fed the output signal of the input amplifier, and the servo member consists of a servomotor operating a mixing flap. In this arrangement, a feedback potentiometer connected to the mixing flap feeds back a signal corresponding to the position of the mixing flap to the input of the position controller. The mixing flap, in this case, controls the ratio between heated air and unheated air. With the feedback feature, the heating system as well as the cooling system are designed as independent regulator circuits with desired value modulation. An alternative design for the heating power regulation on the air side as well as water side includes the outputs of the regulators which are, for example, pulse sequencers wherein the duration of these pulses or the duration of the pulse intervals is varied.

Additional advantages and features of the invention can be seen from the claims, as well as from the description of the drawings illustrating a preferred embodiment of the invention.

BRIEF DESCRIPTION OF THE DRAWINGS

FIG. 1 is a diagram representing the actuating signals as a function of the signal of the input amplifier in a conventional air conditioning system.

FIG. 2 shows the same diagram as in FIG. 1 including a reheating range.

DESCRIPTION OF THE ILLUSTRATED EMBODIMENTS

Figure 3:
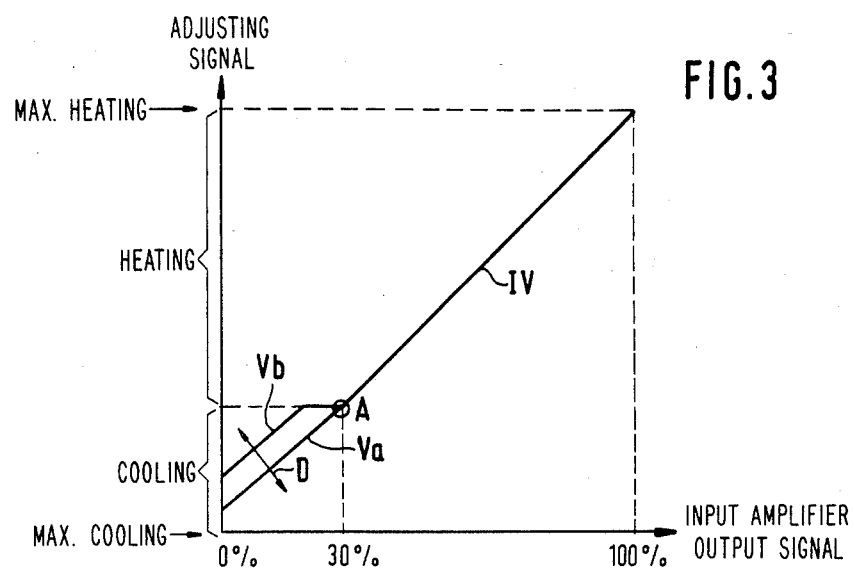
FIG. 3 shows a diagram similar to that of FIG. 1 for the regulator circuit of the present invention.

The diagram of FIG. 1 shows the curve of the actuating signals supplied to the cooling system and the heating system (vertical axis) over the output signal of the input amplifier (horizontal axis) in a conventional air conditioning installation. The input amplifier forms its output signal, in this arrangement, from the weighted summing of various input variables. The input variables can include the internal temperature of the vehicle, the desired temperature and/or the external temperature. The output signal is utilized for controlling the heating system and the cooling system. The correlation between the output signal of the input amplifier and the actuating signals is defined by the characteristic curve I. Thus an output signal from the input amplifier of 100 percent signifies the command "maximum heating" to the heating system whereas an output signal from the input amplifier of zero percent means the command "maximum cooling" to the cooling system. When tracing the characteristic curve I from one end to the other, a transition must occur at a specific point from heating power control and/or vice versa. This transition point is denoted by A in FIG. 1 and is situated, by way of example, at a value of 30 percent of the output signal of the input amplifier. It is to be understood that this transition point can be located on other points along the characteristic curve I.

The following description addresses itself to the case where the characteristic line I is traced from the heating range toward the origin in the direction of the cooling range. At a specific point in time, the transition point A will be reached at which the heating system cuts out and the cooling system begins its functioning. The same desired value is fed at all times to the cooling system in this arrangement, independently of the input signals applied to the input amplifier. Thus, the cooling system does not recognize the input signals of the input amplifier from which the output signal has been formed. Therefore, it is quite possible that the passing through of the transition point A takes place at a relatively low outside temperature. In this case, the cooling system is set fully in operation inasmuch as the same desired value is always indicated to the cooling system at transition point A. With the low external temperature, an air stream is produced at the outlet nozzles terminating into the interior of the vehicle which is cooled excessively, and which can be uncomfortable to the vehicle occupants. As a consequence of the excessive cooling, the air conditioning unit will again pass up the characteristic curve I in a direction away from the origin, thereby passing the transition point A, so that the cooling system is now turned off, and the heating system is turned on. From then on, the entire procedure begins anew so that constant oscillation of the air conditioning unit results around the transition point A. This oscillation is not only found uncomfortable in the interior of the automotive vehicle due to the constantly changing temperature conditions but the constant activation of the refrigeration compressor also entails a higher energy consumption.

FIG. 2 shows the same diagram as FIG. 1 for a conventional air conditioning installation, however, in this instance an overlapping of the heating and/or cooling range is provided. This feature results in the heating system as well as the cooling system being activated within a certain range. In this range, the cooling system and the heating system simultaneously operate to effect dehumidification of the air fed into the interior of the vehicle. The simultaneous operation of heating and cooling systems is called "counter heating" or "reheating" and is known in principle. Reheating operation can be manually activated or can also be automatically set as seen from the example of FIG. 2. Another example of automatic reheating is called "economy reheat" since, for economical reasons, this process is carried out only within a specific transitional range between heating and cooling. As can be seen from FIG. 2, the characteristic curve is in this case divided into a characteristic heating curve II and a characteristic cooling curve III for which various transition points B and C, respectively, apply. As an example, the points B and C were placed, in FIG. 2, on 30% and 40%, respectively, of the output signal from the input amplifier. It is readily apparent that problems are also encountered in case of FIG. 2 during transition from heating operation to cooling operation and vice versa, since points B and C and thus the transitional range are determined independently of the external temperature.

The invention provides a remedy by providing a second amplifier supplied with a signal proportional to the external temperature arranged behind the input amplifier for regulating the cooling power. The supplied signal can shift the characteristic curve of the cooling range in parallel as a function of the outside temperature and/or can effect its slope. An example is illustrated in FIG. 3 wherein the characteristic heating curve IV here corresponds to the characteristic curve I in FIG. 1 insofar as it runs in the heating range. However, as for the characteristic curve of the cooling power, different routes result as a function of the outside temperature. Two possible characteristic cooling power lines are plotted in FIG. 3 and are denoted by Va and Vb, and are merely representative of a family of such curves. Depending on the outside temperature, the cooling power curve can be shifted, for example, in parallel as indicated by the double arrow D. This double arrow thus represents the influence of the external temperature. In the selected illustration, the cooling power line Va corresponds to a high outside temperature, and the cooling power line Vb corresponds to a low outside temperature.

The principle of the invention can be clearly explained by using the characteristic curve Vb as an example. For if the characteristic curve IV is traced in the direction toward the origin, then after traversing the transition point A, the cooling system will not be activated immediately since the characteristic curve Vb in dependence on the external temperature proceeds horizontally over a certain zone. Thus, a range results wherein neither the heating system nor the cooling system is in operation. Therefore, according to this invention, oscillation of the air conditioning unit around point A is prevented. This effect is encountered only if the outer temperature is low as in case of characteristic curve Vb. At a high outside temperature (charactistic curve Va), cooling power regulation starts immediately after the heating unit has been turned off.

Figure 4:
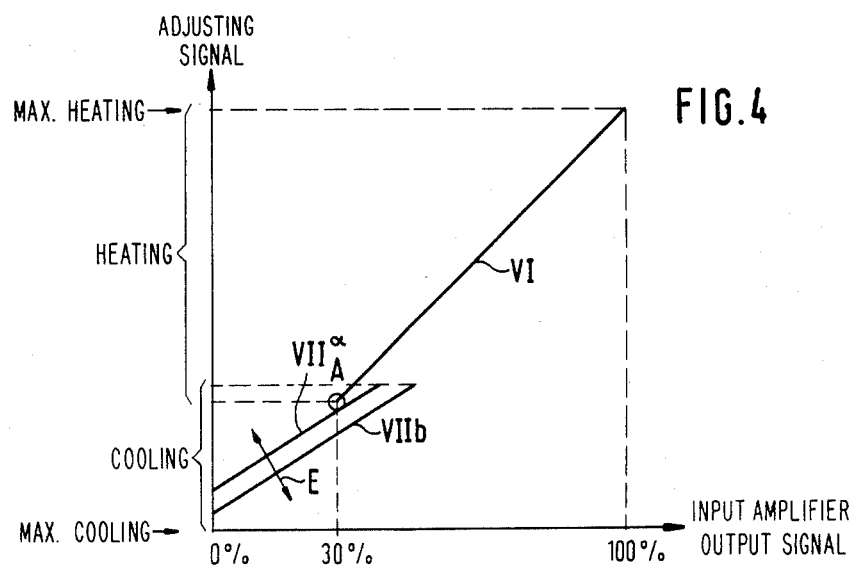
FIG. 4 shows a diagram similar to that of FIG. 2 for the regulator circuit of the present invention.

It is also possible to combine the application of the outside temperature according to this invention to a second amplifier associated with the cooling system to provide a reheating range, as described in FIG. 2. This case is illustrated in FIG. 4. The characteristic heating line is denoted by VI and corresponds to the characteristic line II in FIG. 2. Two examples for the cooling power curve are denoted by VIIa and VIIb, the effect of the external temperatures being denoted analogously to FIG. 3 by a double arrow E. The characteristic line VIIa corresponds to a low outside temperature and the characteristic line VIIb corresponds to a high outside temperature. It can be seen that the transition range is obtained as a function of the outside temperature whereby economical reheat operation becomes possible.

Figure 5:
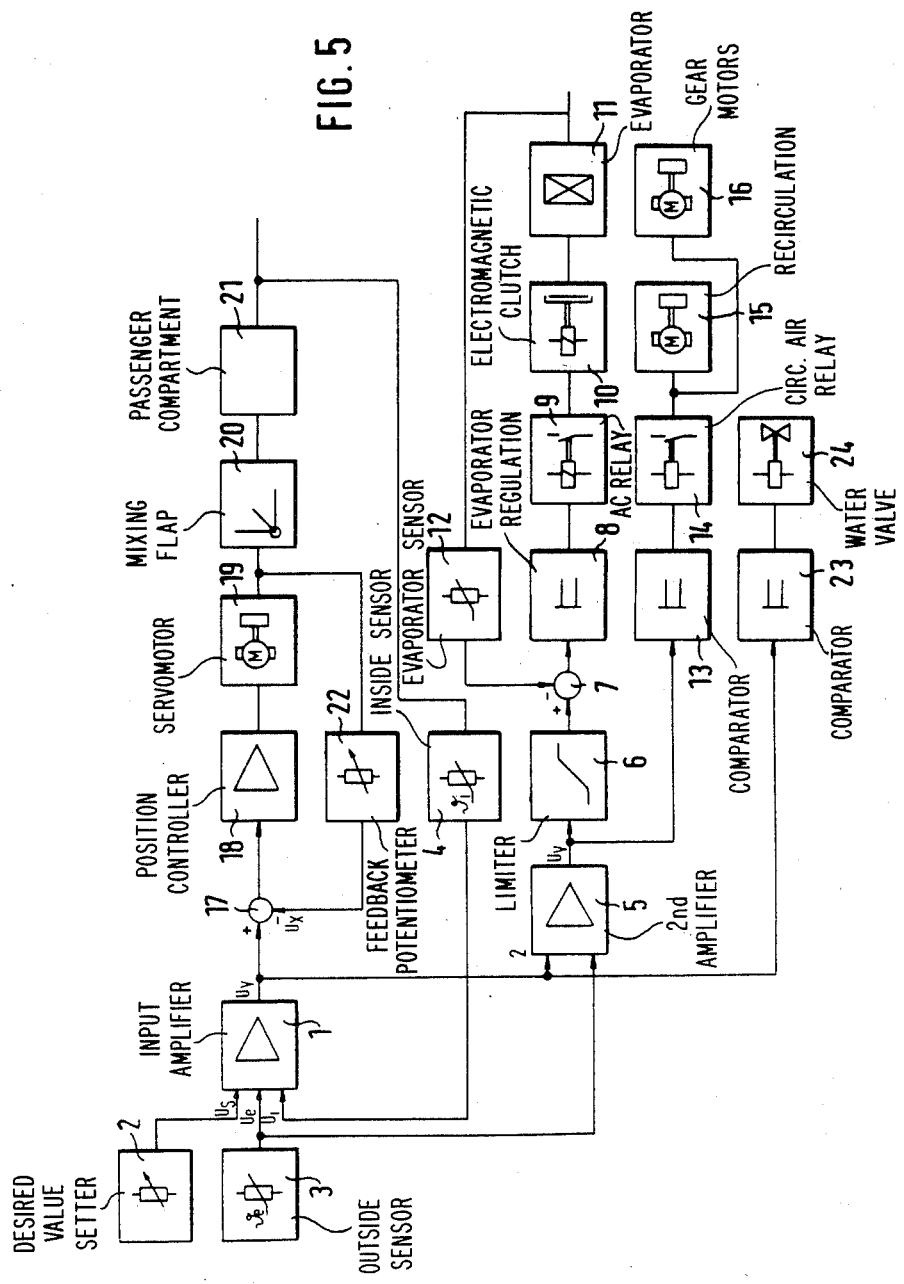
FIG. 5 shows a block circuit diagram for a regulator circuit according to the invention.

The block circuit diagram of one embodiment of the invention is illustrated in FIG. 5. The input amplifier of the regulator circuit is denoted therein by 1 and receives the signals of a desired value setter 2, an outside sensor 3 for sensing the temperature outside the vehicle, and an inside sensor 4 arranged in the interior of the vehicle. A potentiometer can be provided, for example, for the setpoint setter 2, and NTC thermistors can preferably be provided for the temperature sensors 3 and 4. The signals transmitted by the desired value setter 2, the outside sensor 3, and the inside sensor 4 are denoted by $U_s$, $U_e$, and $U_i$ in the illustration of FIG. 5. The input amplifier 1 forms the output signal $U_y$ from these signals.

The output signal $U_y$ is then transmitted by way of a second amplifier 5 to the cooling system. According to the invention, this second amplifier 5 is supplied not only with the signal $U_y$, but also with the signal $U_3$ detected by the outside temperature sensor 3. The behavior of the cooling system is thereby regulated not only by the output signal $U_y$ of the input amplifier 1, but also by the instantaneous measured value of the external temperature.

The output signal $U_v$ of the second amplifier 5 is transmitted to a limiter 6 preventing desired value settings lower than 0° C., thus precluding an icing of the evaporator laminations. This limiter is connected via a summing point 7 to the evaporator temperature regulator 8 which in this case is designed as a two-position regulator. The regulator 8 actuates an AC relay 9 which, in turn, activates the electromagnetic clutch 10 of a refrigeration compressor, not shown herein. The temperature of the evaporator 11 is furthermore detected by an evaporator sensor 12, preferably likewise an NTC thermistor, and fed with negative sign to the summing point 7 located behind the limiter 6 so that regulation results which is transposed to the regulation by the input amplifier 1.

The output signal $U_v$ of the second amplifier 5 can also be used for controlling a fresh air/recirculating air flap. For this purpose, the signal, circumventing the limiter 6, is fed to a comparator 13 and to a recirculating relay 14, as well as to the recirculation gear motors 15 and 16. The values of these components can be selected so that the fresh air/recirculated air flap is operated in the "recirculation" position only during maximum cooling output.

The heating regulation of this installation can take place in a known manner. Two possibilities for this purpose which can also be combined are shown in the block diagram of FIG. 5. For example, it is possible to regulate the heating power on the air side. For this purpose, the output signal $U_y$ of the input amplifier 1 is transmitted via a summing point 17 to a position controller 18 and subsequently to a servomotor 19 controlling the position of a mixing flap 20. This mixing flap 20 determines the ratio between heated air and unheated air passing into the passenger compartment 21. The position of the mixing flap 20 can also be detected by way of a sensor—in this case the feedback potentiometer 22—and fed with negative sign to the summing point 17 whereby a transposed regulation results analogously to the cooling system.

The regulation of the heating system on the water side is obtained by providing that the output signal $U_y$ of the input amplifier 1 regulates a water valve 24 by way of a comparator 23. This water valve interrupts and/or opens up the feed of hot water to the heater heat exchanger.

Figure 6:
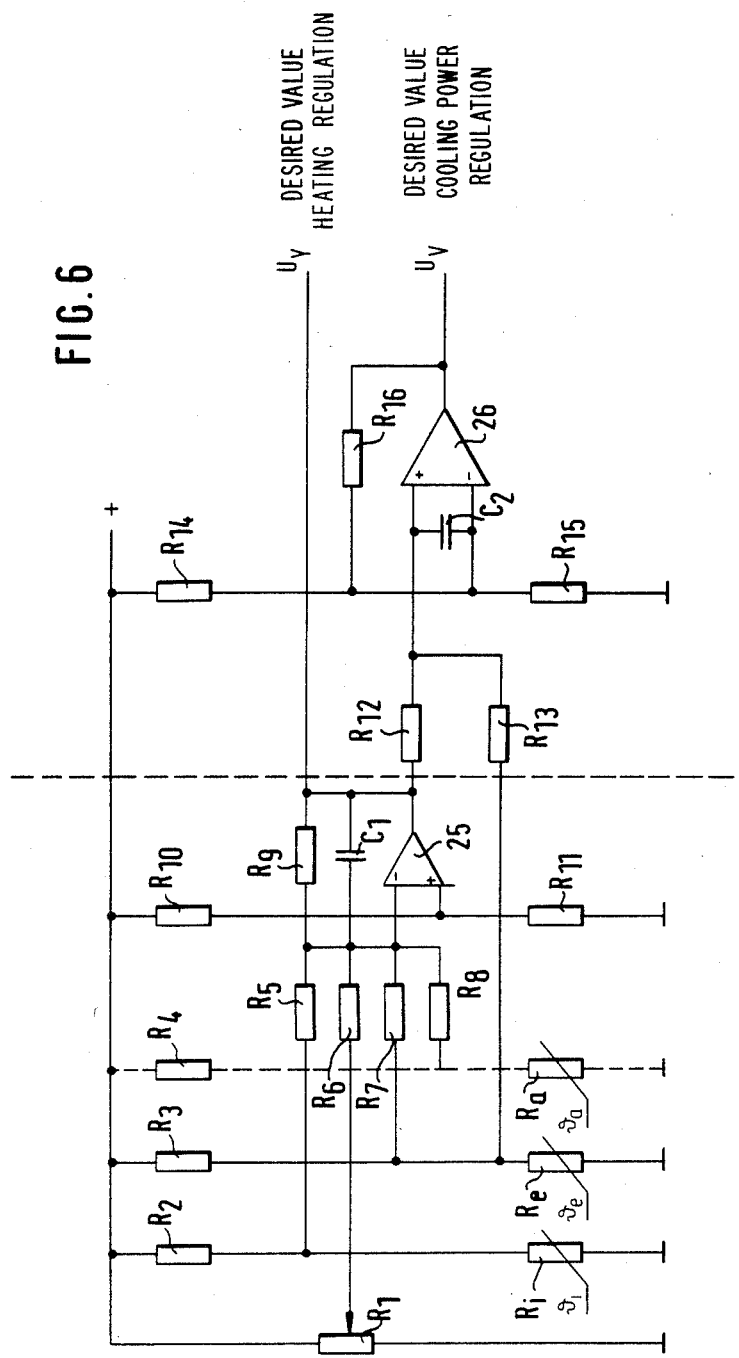
FIG. 6 schematically shows a part of the block circuit diagram of FIG. 5 as an electronic circuit.

Part of the block circuit diagram of FIG. 5 is illustrated in FIG. 6 in the form of an electronic circuit. FIG. 6 shows essentially the wiring of the input amplifier and of the second amplifier and the components associated therewith. The input amplifier 1 is here realized by an operational amplifier 25. This operational amplifier receives the desired value and various measuring variables at its inverted input. The operational amplifier 25 is connected as a summing amplifier in this arrangement.

The potentiometer $R_1$ serves as the desired value setter 2 shown in FIG. 5. In order to cover the various temperatures, voltage dividers are provided, as the temperature sensitive components, NTC thermistors are preferably employed. The voltage divider, made up of the resistor $R_2$ and the NTC thermistor $R_i$, signals the inside temperature of the vehicle, and the voltage divider formed from the resistor $R_3$ and the NTC thermistor $R_e$ signals the outside temperature. Of course, still further input variables can be provided as indicated by the voltage divider made up of resistors $R_4$ and $R_a$, which divider detects still another temperature.

The voltage values determined by the temperature sensors, and the voltage applied to the desired value potentiometer $R_1$, are fed via weighting resistors $R_5$ through $R_8$ to the inverting input of the operational amplifier 25. The effect of the different voltages on the output signal of the operational amplifier can be adjusted by way of the weighting resistors $R_5$ through $R_8$. The operational amplifier receives feedback from the output to its inverting input the resistor $R_9$, a capacitor $C_1$ being arranged in parallel to this resistor for phase compensation. The noninverting input of the operational amplifier 25 is at a fixed voltage produced by the voltage divider formed from resistors $R_{10}$ and $R_{11}$.

The output signal $U_y$ of the operational amplifier 25 can be utilized directly as the desired value for the heating regulation. Fo regulating the cooling power, however, it is necessary to interpose an additional amplifier. This amplifier is provided with reference numeral 5 in the illustration of FIG. 5 and is realized by FIG. 6 by a second operational amplifier 26. The output signal $U_y$ of the first operational amplifier 25 is supplied to the noninverting input of operational amplifier 26 via a resistor $R_{12}$. A voltage proportional to the outside temperature is supplied to the noninverting input of second operational amplifier 26 via a further resistor $R_{13}$. This feature causes the characteristic cooling power curve to be altered in accordance with the invention. Depending on the choice of weighting resistors $R_{12}$ and $R_{13}$, a reheating operation is also made possible. By the wiring of resistors $R_{14}$ through $R_{16}$, which are connected to the inverting input of operational amplifier 26, a constant voltage is subtracted from the voltage applied to the noninverting input. Besides, a capacitor $C_2$ is connected between the inverting input and the noninverting input. The output signal $U_v$ of the operational amplifier 26 then serves as desired value setting for the cooling system.

Figure 7:
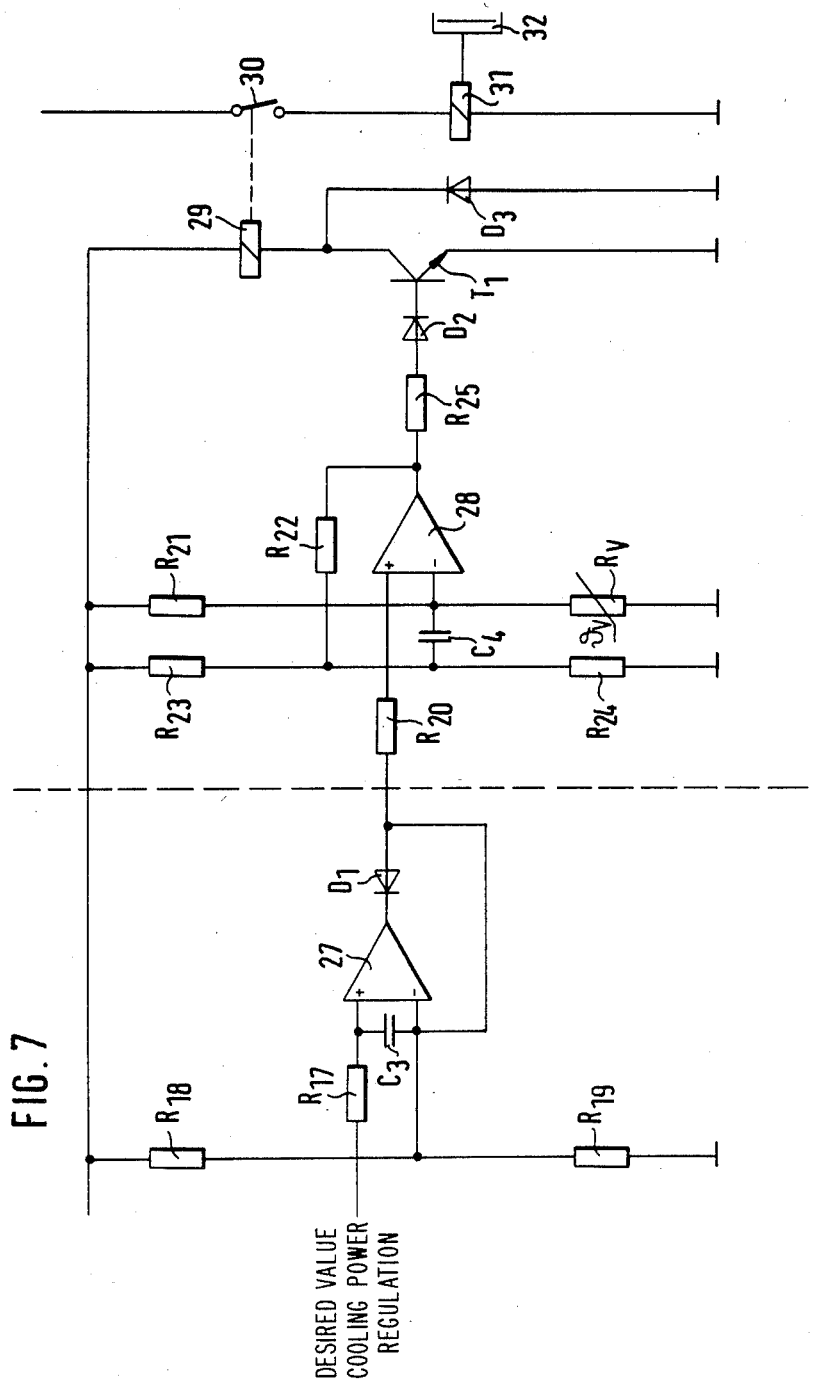
FIG. 7 shows schematically another part of the block circuit diagram of FIG. 5 as an electronic circuit.

The actual cooling system regulation of FIG. 5 is shown schematically in FIG. 7 as an electronic circuit. The output signal $U_v$ of the operational amplifier 26 according to FIG. 6 passes via a resistor $R_{17}$ to the noninverting input of an operational amplifier 27. This operational amplifier 27 corresponds to the limiter 6 of FIG. 5. A fixed voltage defined by resistors $R_{18}$ and $R_{19}$ is applied to the inverting input of the operational amplifier 27. This voltage is also applied via a diode $D_1$ to the output of the operational amplifier. Therefore, this diode blocks if the output voltage at the operational amplifier 27 exceeds a certain value corresponding to the voltage defined by resistors $R_{18}$ and $R_{19}$ minus the diode forward voltage. The voltage applied to the subsequent components of the circuit thus cannot exceed a specific value. Consequently, the voltage-limiting function can be assigned to the diode $D_1$. In contrast to the illustrations in FIGS. 3 and 4, a high voltage here corresponds to the command "maximum cooling," and a low voltage corresponds to the command "less cooling" and/or "no cooling." This is a level reversal effected by the operational amplifier 25 wired in an inverting mode. Furthermore, a capacitor $C_3$ is arranged between the inverting input and the noninverting input of the operational amplifier 27.

The signal applied to the output signal of the operational amplifier 27 is transmitted via the diode $D_1$ and a further resistor $R_{20}$ to the noninverting input of an operational amplifier 28. This operational amplifier represents an evaporator temperature regulator designed as a two-position regulator, and corresponds to reference numeral 8 in FIG. 5. A voltage proportional to the evaporator temperature is fed to the inverting input of the operational amplifier. This voltage is detected by an NTC thermistor $R_v$ which, together with another resisitor $R_{21}$, forms a voltage divider. The output of the operational amplifier 28 is furthermore connected via a resistor $R_{22}$ to a voltage divider made up of the resistors $R_{23}$ and $R_{24}$, and this voltage divider is connected via a capacitor $C_4$ to the inverting input of the operational amplifier 28.

Further, a resistor $R_{25}$ is located at the output of the operational amplifier 28, the second terminal of this resistor being connected to the anode of a diode $D_2$. The cathode of this diode is connected to the base of a transistor $T_1$. The resistor $R_{25}$ serves for limiting the base current through the transistor. The emitter of the transistor is connected to ground, while a relay 29 is connected to the collector wire. Rendering transistor $T_1$ conductive will result in energizing of relay 29 closing switching contacts 30. Furthermore, a freerunning diode $D_3$ is connected between collector and emitter of transistor $T_1$. Diode $D_3$ receives the current which, after blocking the transistor $T_1$, continues to flow through the field winding of relay 29.

The magnet 31 of an electromagnetic clutch 32 can be energized by means of the switching contact 32 of relay 29. This electromagnetic clutch 32 actuates a refrigeration conpressor not shown herein, whereby the cooling system is set into operation.

Although the invention has been described in detail with reference to the illustrated embodiments, variations and modifications exist within the scope and spirit of the invention as described and as defined in the following claims.

What is claimed is:

1. A regulator circuit for controlling the cooling and heating system of an automotive vehicle comprising:
   a first amplifier having an output signal connected to a means for regulating the heating of the vehicle, means for supplying the first amplifier with a signal proportional to the external temperature, means for supplying the first amplifier with a signal proportional to the internal temperature of the vehicle, and means for supplying the first amplifier with a signal proportional to the desired temperature for the vehicle, a second amplifier having an output signal connected to a means for regulating the cooling of the vehicle, means for supplying an input of the second amplifier with the output signal of the first amplifier, and means for supplying the input of the second amplifier with a signal proportional to the external temperature of the vehicle.

2. The regulator circuit of claim 1 wherein the first amplifier and the second amplifier are connected as summing amplifiers.

3. The regulator circuit of claim 1 further comprising means connected to the input of the second amplifier for weighting the signal proportional to the external temperature.

4. The regulator circuit of claim 1 further comprising resistor means connected in the input circuits of the first and second amplifier, the values of the resistor means being selected such that cooling regulation is initiated by the second amplifier only when the first amplifier has caused heating to cease.

5. The regulator circuit according to claim 1 further comprising resistor means connected in the input circuits of the first and second amplifier, the resistor means being selected such that there is a thermal overlap region where the output signals of the first and second amplifiers are both non zero.

6. The regulator circuit according to claim 1 further comprising a limiter means connected to the output of the second amplifier for controlling the maximum output signal value of the second amplifier, and a two-position regulator connected to the output of the limiter means for controlling activation and deactivation of a refrigeration compressor.

7. The regulator circuit according to claim 6 further comprising a relay having a coil connected to the two-position regulator, the relay having contacts closed by a field generated by the coil, the contacts being connected to an electromagnetic clutch for actuating the refrigeration compressor for cooling the vehicle.

8. A regulator circuit according to claim 6 further comprising a temperature probe for generating a signal proportional to the temperature of a cooling evaporator, and means for connecting an output of the temperature probe to an input of the two-position regulator such that the signal proportional to the cooling evaporator temperature is fed back to an input of the two-position regulator.

9. The regulator circuit according to claim 1 further comprising flap control means for controlling the position of a fresh air/recirculated air flap and means for connecting the flap control means to the output signal of the second amplifier.

10. The regulator circuit according to claim 9 wherein the flap control means comprises a relay for controlling the position of the fresh air/recirculated air flap, and a comparator connected to the relay and to the output of the second amplifier, the comparator being set such that the flap is operated to the "recirculated air" position only when the output of the second amplifier achieves a maximum value.

11. The regulator circuit according to claim 1 further comprising a comparator connected to the output of the first amplifier and a servo member connected to the output of the comparator for controlling the flow of water through a heating radiator.

12. The regulator circuit according to claim 1 further comprising a position controller connected to the output of the first amplifier, a servomotor connected to the output of the position controller, the servomotor operating a flap controlling the mixture of heated air and unheated air being introduced into the vehicle, and means for generating a signal corresponding to the position of the flap, the signal being connected to the input of the position controller.

13. The regulator circuit according to claim 11, further comprising a position controller connected to the output of the first amplifier, a servomotor connected to the output of the position controller, the servomotor operating a flap controlling the mixture of heated air and unheated air being introduced into the vehicle, and means for generating a signal corresponding to the position of the flap, the signal being connected to the input of the position controller.

14. The regulator circuit according to claim 6 further comprising flap control means for controlling the position of a fresh air/recirculated air flap and means for connecting the flap control means to the output signal of the second amplifier before said limiter means.

* * * * *